UNITED STATES PATENT OFFICE.

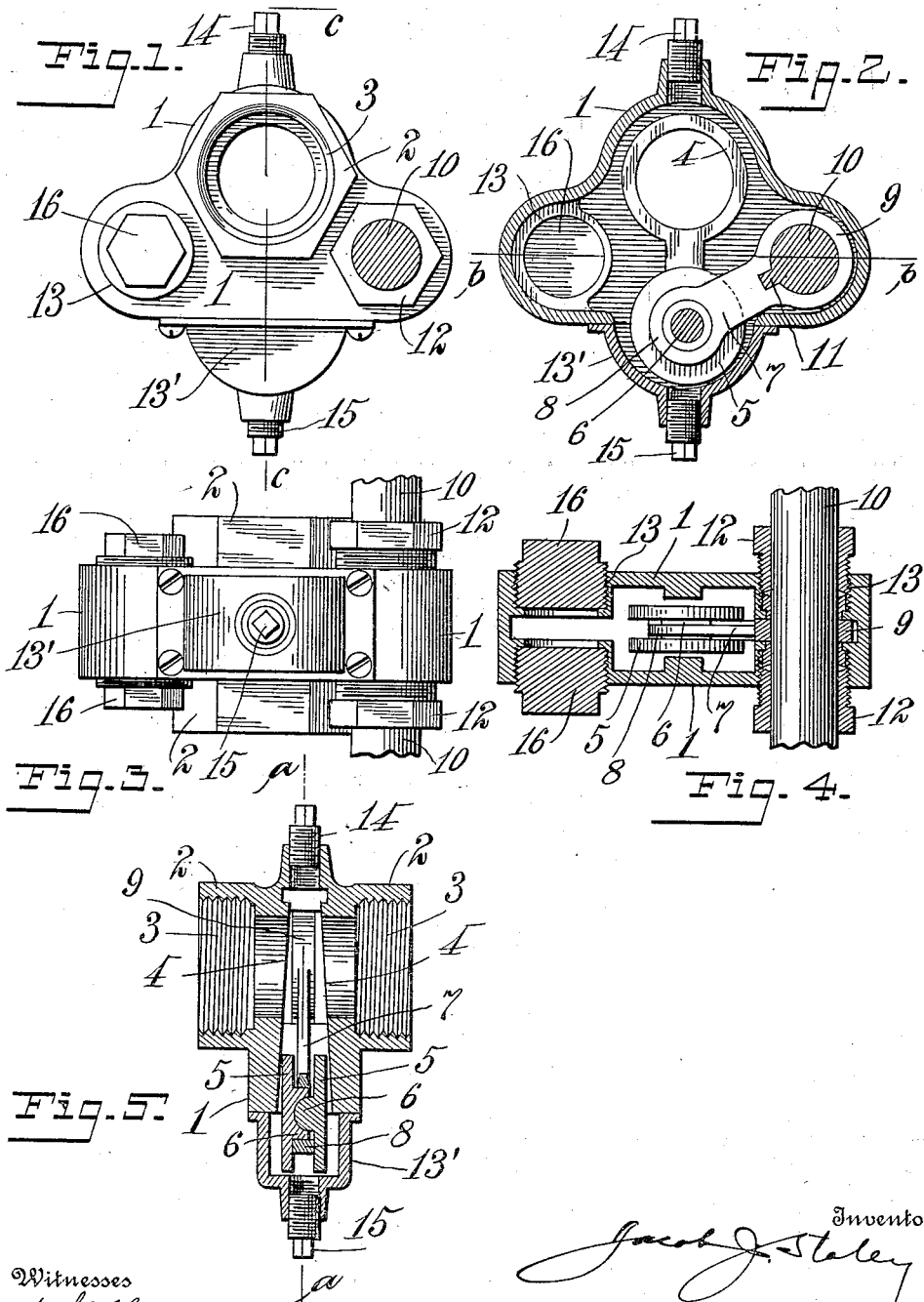

JACOB J. STALEY, OF DAYTON, OHIO.

VALVE.

1,048,906. Specification of Letters Patent. Patented Dec. 31, 1912.

Application filed March 21, 1912. Serial No. 685,223.

*To all whom it may concern:*

Be it known that I, JACOB J. STALEY, a citizen of the United States, residing at Dayton, in the county of Montgomery and State of Ohio, have invented certain new and useful Improvements in Valves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in valves.

The object of the invention is to provide a quick acting valve which may be placed in a variety of positions, thereby permitting it to be used in locations, and out of the way places, where space is restricted.

Referring to the accompanying drawings, Figure 1, is an elevation of my improved valve; Fig. 2 is a vertical section on the line *a—a* of Fig. 5; Fig. 3 is a bottom plan view of the valve; Fig. 4, is a section on the line *b—b* of Fig. 2; and Fig. 5 is a longitudinal vertical section on the line *c—c* of Fig. 1.

In the specification and drawings, similar reference characters indicate corresponding parts.

Referring more particularly to the drawings, 1 represents a valve casing provided with hexagonal extensions 2. The extensions 2 are provided with interiorly threaded openings 3 which are adapted to receive the threaded ends of pipe sections (not shown). The interior of the casing 1 is provided with annular valve seats 4 which are in alinement with the threaded openings 3. The valve seats 4 are placed at angles relative to each other, and are adapted to be engaged by valve disks 5 to close the valve. The disks 5 are provided with ball and socket portions 6 by means of which they are enabled to move in unison. The form of the ball and socket joint permits said disks to move relative to each other and to close the valve by the operation of a crank 7. The end of said crank is provided with an eye 8 which surrounds the socket projection 6, and the other end of which is provided with an eye 9 which surrounds a valve stem 10. The crank 7 is attached to and movable with the stem 10 by means of a key 11 integral with the stem 10. The stem 10 extends through both sides of the valve casing and is journaled in packing glands 12 which are mounted in threaded openings 13 in the valve casing. The valve casing 1 is provided with two sets of threaded openings 13, one set on each side of the threaded pipe openings 3. This construction permits the valve stem 10 to be mounted on either side of the valve thereby permitting said valve to be placed in places where the space is restricted. The threaded openings 13, not occupied by the stem 10 are closed by plugs 16. The stem 10 is adapted to be placed on either side of the valve, depending upon the location of the valve.

Valves of this type may be used on gas piping, where the valve disks 5 are subject to corrosion. To prevent any deteriorating action under these circumstances, the valve is so constructed that the disks 5 will be immersed in a bath of oil when the valve is open. Attached to the bottom of the casing 1 is a cup 13' in which the disks 5 normally rest when the valve is open. Oil may be placed in this cup, and in the lower portion of the valve casing, through an opening closed by a plug 14. The oil may be drained from the valve through an opening closed by a plug 15 in the bottom of the cup 13'.

It will be seen from Figs. 2 and 3, that by rocking the stem 10, the disks 5 will be moved to a position to engage the valve seats 4, and as the seats 4 are placed at an angle relative to each other, and the disks 5 are independently movable, the said disks will engage the seats snugly, thereby effectually closing the valve.

Having described my invention, I claim,

1. In a valve, a casing having valve seats, pipe apertures alined with said seats, and alined apertures on each side of said pipe apertures, plugs for closing one or the other sets of said last named apertures, a valve stem adapted to be mounted in one or the other sets of said last named apertures, a crank member attached to said valve stem within said casing, and flexibly connected valve disks engaged by said crank member.

2. A valve comprising a casing having oppositely disposed pipe apertures, tapered valve seats between said pipe apertures, and sets of apertures on each side of said pipe apertures, a valve stem adapted to be mounted in one set of said apertures on either side of said pipe apertures, plugs adapted to close the apertures on the side of the pipe apertures which are no occupied by said valve stem, valve disks adapted to be moved to and from said seats, said valve disks having a ball and socket connection which permits of their engagement with said valve seats, an oil chamber in which said valve disks lie when not engaging said seats, and a crank member connecting said valve disks with the stem.

In testimony whereof I affix my signature, in presence of two witnesses.

JACOB J. STALEY.

Witnesses:
R. J. McCarty,
Matthew Siebler.

Copies of this patent may be obtained for five cents each, by addressing the "Commissioner of Patents, Washington, D. C."